United States Patent [19]

Hagelauer

[11] Patent Number: 5,009,682
[45] Date of Patent: Apr. 23, 1991

[54] APPARATUS FOR DEGASSING FLUIDS

[75] Inventor: Ulrich Hagelauer, Bottighofen, Fed. Rep. of Germany

[73] Assignee: Storz Medical AG, Kreuzlingen, Switzerland

[21] Appl. No.: 454,857

[22] Filed: Dec. 22, 1989

[30] Foreign Application Priority Data

Dec. 31, 1988 [DE] Fed. Rep. of Germany ....... 3844460

[51] Int. Cl.$^5$ .............................................. B01D 19/00
[52] U.S. Cl. ........................................ 55/159; 55/52; 55/55; 55/160; 55/189; 55/190; 55/195
[58] Field of Search .................... 55/36, 55, 159, 160, 55/189, 190, 195, 52

[56] References Cited

U.S. PATENT DOCUMENTS

| 2,455,681 | 12/1948 | Kantor et al. | 55/55 X |
| 3,616,599 | 11/1971 | Burnham, Sr. | 55/55 X |
| 3,834,136 | 9/1974 | Dussourd et al. | 55/189 X |
| 4,696,684 | 9/1987 | Shen | 55/189 X |
| 4,715,398 | 12/1987 | Shouldice et al. | 55/189 X |
| 4,718,922 | 1/1988 | Roffelsen | 55/55 |

FOREIGN PATENT DOCUMENTS

| 2329597 | 5/1977 | France | 55/189 |
| 60-210678 | 10/1985 | Japan | 55/189 |

Primary Examiner—Richard L. Chiesa
Attorney, Agent, or Firm—Evenson, Wands, Edwards, Lenahan & McKeown

[57] ABSTRACT

An apparatus for degassing fluids uses a pressure-resistant container, in which the fluid to be degassed is stored and in which low pressure for carrying out the degassing process is produced. The apparatus further includes a supply vessel, containing the fluid to be degassed, which surrounds the pressure-resistant container; and a valve connecting the container and the supply vessel. Connected to the pressure-resistant container in such a manner that fluid can flow is a piston/cylinder unit, the working piston of which opens or closes the valve due to the low pressure in the container in such a manner that the fluid flows in from a fluid supply surrounding the pressure-resistant container and the separated gas escapes through the container opening.

12 Claims, 1 Drawing Sheet

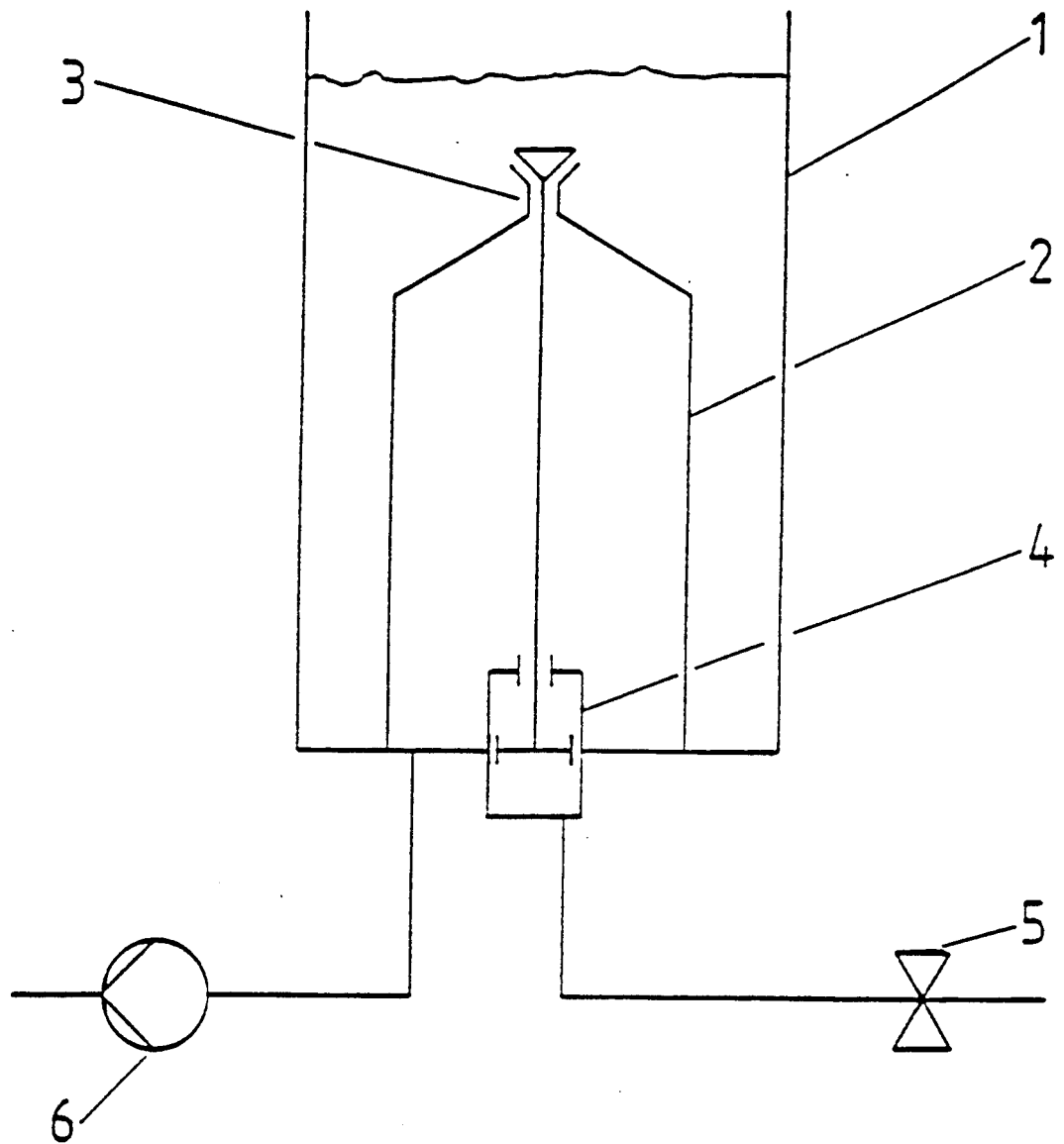

APPARATUS FOR DEGASSING FLUIDS

BACKGROUND AND SUMMARY OF THE INVENTION

The present invention relates to an apparatus for degassing fluids using a pressure-resistant container, in which the fluid to be degassed is stored and in which low pressure can be produced for carrying out the degassing process.

Apparatuses of this type have wide application in many fields of technology and medicine. In particular, they are required in lithotriptors.

Medical lithotriptors, with extra-corporally arranged systems for producing pressure waves, require a fluid medium for transmission, usually water or water-like fluids with regard to their sound transmission properties. Losses may occur in the transmission of pressure waves, because the fluid contains dissolved gases or very finely distributed gas bubbles, which enlarge the compressibility and thereby reduce the desired rapid and substantial increases in pressure in the course of propagation of the pressure waves and diminish the desired crushing effect.

Further problems associated with dissolved and very finely distributed gases and gas bubbles occur when macroscopic air bubbles are formed due to germination on the patient's skin or on the coupling pads or membranes, which are often used. Due to a rise in compressibility, they also lead to considerable losses in the transmission of the pressure wave, as well as to the reflection of the pressure wave.

Bleeding under the skin, which tends to develop where the air bubbles form around the patient, is a problem as well. Further problems with air bubbles result in arrangements, in which ultrasound piling processes are arranged within the pressure wave transmission area for piling the concrement to be crushed. In this case, too, total reflection of the soundwaves occurs so that piling is made difficult or impossible.

There are apparatuses disclosed for degassing fluids, in which the pressure in the fluid is lowered in such a manner that gas escape is spontaneous. Pressure resistant containers are employed for separation in the gas phase in an upper part of which the separated gas collects and is removed again at specific cyclical periods. This may be done by removing the separated gas by suction against the low pressure prevailing in the container. Another possibility is increasing the pressure above the ambient pressure, flooding the container and removing the gas via an opening positioned at the highest point in the container.

The state of the art apparatuses require control and regulating devices in order to obtain the desired cyclical mode of operation. Thus, removing the separated gas by suction against the prevailing low pressure requires a device for regulating the level, a pump for removing the fluid by suction, another pump for removing the gas by suction and a device for monitoring the pressure. The second cited process also requires control devices in order to raise and lower the pressure cyclically and control gas escape.

Both state of the art processes can be combined with a spray device or injectors (inductors) in order to boost the degassing effect and obtain quasi continuous operation, respectively long cycle times for the degassing and short times for filling/gas elimination.

Other apparatuses utilize the decrease in gas solubility with the temperature, i.e. degassing is attained by heating the fluid. This heating, can be combined with processes in which low pressure is applied.

An object of the present invention is to improve an apparatus for degassing fluids using a pressure-resistant container, in which the fluid to be degassed is stored and in which low pressure for carrying out the degassing process is produced, in such a manner that the degassing process can be carried out quickly by simple means and with the reliability required, in particular, in medical instruments.

In accordance with preferred embodiments of the present invention, a supply vessel containing the fluid to be degassed surrounds a pressure-resistant container. A valve connects the container and the supply vessel. Connected to the pressure-resistant container, in such a manner that a fluid can flow, is a piston/cylinder unit. A working piston of the piston/cylinder unit opens, or closes the valve due to the low pressure prevailing in the container in such a manner that the fluid flows in from a fluid supply surrounding the pressure-resistant container and the separated gas escapes through the opening in the container.

Advantages of the present invention include a reduction in the number of control and regulating components and a shortening of the cycle time for filling/gas elimination, using a device in which the low pressure prevailing in the container itself is utilized to control the cycle.

According to one embodiment of the present invention, a valve opening of the valve is placed at the highest point in the container. Moreover, the working piston acts on the valve by mechanical means and, in particular, a piston rod, ensuring that, with the simplest possible construction, complete degassing occurs, i.e. no nests of gas bubbles form.

In a further embodiment, the pressure difference at the working piston is varied by means of another valve permitting precise setting of the characteristic of the present apparatus.

Also serving this purpose is a design in which hydraulic cross-sections of the working piston and the closing valve differ.

Yet a further embodiment described includes a force/path transmission incorporated into the mechanical means for transferring power between the working piston and the closing valve also serves this purpose.

Additionally, the working piston can act like a damping piston, a damping of which is varied by means of an inductor in such a manner that there is a delay between the pressure balance and the closing of the closing valve.

As an alternative, the aforegoing delay can also be attained by a control unit and, in particular, an electronic control unit, which brings about a time delay between balancing the pressure and closing the closing valve.

In any event, it is very advantageous if the degassing can be additionally boosted by stirring the fluid, injecting the fluid by means of inductors, Venturi tubes, heating the fluid, etc.

Due to its safe operation and low costs of production, the present apparatus is particularly suited for use in medical lithotriptors.

Other objects, advantages and novel features of the present invention will become apparent from the following detailed description of the invention when considered in conjunction with the accompanying drawings.

BRIEF DESCRIPTION OF THE DRAWING

The single FIGURE of the present application schematically illustrates, in cross-section, an embodiment of the apparatus of the present invention.

DESCRIPTION OF THE PREFERRED EMBODIMENT

The present invention is made more apparent in the following section using a preferred embodiment with reference to the accompanying drawing, the single figure of which shows a schematic cross-section of an invented apparatus.

The present apparatus includes a fluid container 1, an exsiccator vessel 2, a closing valve 3 for eliminating gas, a working piston 4 connected thereto, a further valve 5 and a pump 6.

At the beginning of a degassing cycle, the exsiccator 2 is filled with fluid and the further valve 5 is closed. The operation of the pump 6 builds up the low pressure required for the degassing and the closing valve 3 closes automatically due to the resulting difference in pressure across working piston 4 connected thereto. Due to the low compressibility of fluids, the drop in pressure following closing of the closing valve 3 ensues very quickly so that the gas escapes from the fluid spontaneously.

The pump 6 conveys the degassed fluid out of the exsiccator 2 within a fixed period of time. After this time has lapsed, the further valve 5 is briefly opened. Due to the surface of the working piston 4 being larger than the surface of the closing valve 3, the piston 4 moves up and opens the closing valve 3. The fluid in the container 1 flows quickly into the exsiccator 2, the pressure in the exsiccator 2 rises and the working piston 4 sinks.

At this point in time, the further valve 5 is already closed, the sinking velocity, i.e. the delay between balancing the pressure and closing the closing valve 3 of the piston, can be fixed by means of an inductor bore hole (not shown) which is constructed in such a manner that the air in the upper part of the exsiccator 2 can escape via the still open closing valve 3. When the working piston 4 has sunk far enough, the closing valve 3 closes and the degassing cycle begins anew.

In the foregoing section the present invention has been made apparent using a preferred embodiment without the intention of limiting the scope of the overall inventive concept, within which there are, of course, many very different modifications and alterations possible. By way of illustration, mechanical and electronic damper means may be provided, which cause a delay between balancing the pressure and closing the closing valve.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An apparatus for degassing fluids comprising,
 a pressure-resistant container for storing a fluid to be degassed;
 a low pressure producing means for producing a low pressure in the pressure-resistant container for carrying out a degassing of fluids;
 a supply vessel for supplying the fluid to be degassed to the pressure-resistant container, the supply vessel surrounding the pressure-resistant container;
 a valve for connecting the pressure-resistant container to the supply vessel at a valve opening, the valve having open and closed positions; and
 a piston/cylinder unit having a working piston for moving the valve between the opened and closed positions due to a pressure differential across the working piston resulting from the low pressure in the pressure-resistant container so that fluid to be degassed flows into the pressure-resistant container from the surrounding supply vessel and separated gas escapes through the valve opening.

2. An apparatus according to claim 1, wherein the valve opening is placed at the highest point in the container and a mechanical means connects the working piston to the valve.

3. An apparatus according to claim 2, wherein said mechanical means is a piston rod.

4. An apparatus according to claim 2, wherein the mechanical means for transmitting force between the working piston and the valve contains a force/path transmission.

5. An apparatus according to claim 1, wherein the pressure differential across the working piston is varied by means of an additional valve connected to a side of the working piston facing away from the pressure-resistant container.

6. An apparatus according to claim 1, wherein hydraulic cross-sections of the working piston and of the valve differ.

7. An apparatus according to claim 1, wherein the working piston is a damping piston, a damping of which is varied by means of an inductor in such a a manner that there is a delay between balancing the pressure differential across the working piston and the closing of the valve.

8. An apparatus according to claim 1, wherein a control unit brings about a time delay between balancing the pressure differential across the working piston and the closing of the valve.

9. An apparatus according to claim 8, wherein said control unit is an electronic control unit.

10. An apparatus according to claim 1 wherein the degassing is additionally boosted by degassing boosting means.

11. An apparatus according to claim 10, wherein the degassing boosting means includes at least one of stirring means for stirring the fluid, heating means for heating the fluid, injecting means for injecting the fluid.

12. An apparatus according to claim 11, wherein the injecting means includes at least one of inductors and venturi tubes.

* * * * *